(12) United States Patent
Inbar et al.

(10) Patent No.: US 6,279,253 B1
(45) Date of Patent: *Aug. 28, 2001

(54) SELF-MASKING TRANSPARENCY VIEWING APPARATUS

(75) Inventors: Dan Inbar; Giora Teltsch, both of Haifa (IL)

(73) Assignee: Smartlight Ltd., Yokneam-Elit (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,577

(22) Filed: Jan. 28, 1999

Related U.S. Application Data

(62) Continuation of application No. 08/856,857, filed on May 15, 1997, now Pat. No. 5,890,305, which is a continuation of application No. 08/358,603, filed on Dec. 14, 1994, now abandoned, which is a continuation of application No. 07/861,982, filed as application No. PCT/EP91/00065 on Dec. 17, 1990, now Pat. No. 5,430,964, which is a continuation-in-part of application No. 07/537,799, filed on Jun. 14, 1990, now abandoned.

(30) Foreign Application Priority Data

Dec. 31, 1989 (IL) .......................................... 092936

(51) Int. Cl.$^7$ .................................................. G02B 27/02
(52) U.S. Cl. .............................. 40/361; 40/448; 345/104; 345/173
(58) Field of Search .............................. 40/361, 362, 366, 40/367, 448, 564; 362/97, 802; 345/87, 102, 104, 173

(56) References Cited

U.S. PATENT DOCUMENTS

| | | |
|---|---|---|
| 1,988,654 | 1/1935 | Haag . |
| 2,436,162 | 2/1948 | Cadenas . |
| 2,516,270 | 7/1950 | Swain . |

(List continued on next page.)

FOREIGN PATENT DOCUMENTS

| | | |
|---|---|---|
| 1961126 | 7/1970 | (DE) . |
| 3331762 | 3/1985 | (DE) . |
| 9010889 | 1/1991 | (DE) . |

(List continued on next page.)

OTHER PUBLICATIONS

Patent Abstract of Japan, vol. 17, No. 464 (P1599).
Jameson et al., "Visual Psychophysics", pp. VII, VIII, 43–49, 54 and 78–101, 1972.

(List continued on next page.)

*Primary Examiner*—Brian K. Green
(74) *Attorney, Agent, or Firm*—Fenster & Company Patent Attorneys, Ltd.

(57) ABSTRACT

A viewing apparatus (11) for transparencies or the like masks any display areas (20) not covered by transparencies (505–508) by generating masks without moving parts, and adapts the luminance level of the image under study and of other display areas to the optimal viewing conditions required by the observer.

20 Claims, 9 Drawing Sheets

U.S. PATENT DOCUMENTS

| | | |
|---|---|---|
| 2,754,605 | 7/1956 | Berkeley . |
| 3,246,412 | 4/1966 | Sommerhoff . |
| 3,249,691 * | 5/1966 | Bigelow ............................... 348/110 |
| 3,322,485 | 5/1967 | Williams . |
| 3,492,486 | 1/1970 | Bischoff et al. . |
| 3,714,413 | 1/1973 | Craig . |
| 3,953,764 | 4/1976 | Miller et al. . |
| 4,004,360 | 1/1977 | Hammond . |
| 4,118,654 | 10/1978 | Ohta et al. . |
| 4,335,936 | 6/1982 | Nonomura et al. . |
| 4,368,467 | 1/1983 | Unotoro et al. . |
| 4,373,280 | 2/1983 | Armfield, III . |
| 4,378,557 | 3/1983 | Murata . |
| 4,403,832 | 9/1983 | Tanaka et al. . |
| 4,448,490 | 5/1984 | Shibuya et al. . |
| 4,454,904 | 6/1984 | Oxman . |
| 4,510,708 | 4/1985 | Pokrinchak . |
| 4,637,150 | 1/1987 | Geluk . |
| 4,707,080 | 11/1987 | Fergason . |
| 4,775,918 | 10/1988 | Snyder . |
| 4,799,083 | 1/1989 | Knodt . |
| 4,833,542 | 5/1989 | Hara et al. . |
| 4,850,675 | 7/1989 | Hatanaka et al. . |
| 4,855,725 | 8/1989 | Fernandez . |
| 4,859,037 | 8/1989 | Iwashita et al. . |
| 4,901,155 | 2/1990 | Hara et al. . |
| 4,908,876 | 3/1990 | Deforest et al. . |
| 4,917,465 | 4/1990 | Conner et al. . |
| 4,952,036 | 8/1990 | Gulick et al. . |
| 4,966,441 | 10/1990 | Conner . |
| 4,977,315 | 12/1990 | Purcell . |
| 4,983,956 | 1/1991 | Salam . |
| 4,996,786 * | 3/1991 | Shoenfeld ............................... 40/361 |
| 5,124,818 | 6/1992 | Conner et al. . |
| 5,155,608 | 10/1992 | Hatano . |
| 5,159,363 | 10/1992 | Brauning . |
| 5,313,726 | 5/1994 | Yaniv et al. . |
| 5,430,964 | 7/1995 | Inbar et al. . |
| 5,491,332 | 2/1996 | Inbar et al. . |
| 5,623,280 * | 4/1997 | Akins ............................... 345/104 |
| 5,760,851 | 6/1998 | Inbar et al. . |
| 5,790,216 | 8/1998 | Inbar et al. . |
| 5,835,173 | 11/1998 | Inbar et al. . |
| 5,859,676 | 1/1999 | Inbar et al. . |
| 5,890,305 * | 4/1999 | Inbar et al. ............................... 40/361 |

FOREIGN PATENT DOCUMENTS

| | | |
|---|---|---|
| 3933988 | 4/1991 | (DE) . |
| 0035382 | 9/1981 | (EP) . |
| 0165548 | 12/1985 | (EP) . |
| 0253379 | 1/1988 | (EP) . |
| 0352101 | 1/1990 | (EP) . |
| 0412757 | 2/1991 | (EP) . |
| 0436267 | 7/1991 | (EP) . |
| 2559923 | 8/1985 | (FR) . |
| 2050032 | 12/1980 | (GB) . |
| 2062930 | 5/1981 | (GB) . |
| 6484141 | 3/1989 | (JP) . |
| 8903064 | 4/1989 | (WO) . |
| 9006537 | 6/1990 | (WO) . |
| 9110152 | 7/1991 | (WO) . |
| 9301564 | 1/1993 | (WO) . |

OTHER PUBLICATIONS

E. Kaneko, "Liquid Crystal TV Displays: Principles and Applications of Liquid Crystal Displays", pp. 77–137.

T.N. Ruckmongathan et al., Japan Display 1992, "S3–4 New Addressing Technique for Fast Responding STN LCDs", pp. 65–68.

K. Tarumi et al. Japan Display 1992, "S15–5 On the Relationship between the Material Parameters and the Switching Dynamics in Twisted Nematic Liquid Crystal", pp. 587–590.

P.M. Alt et al., IEEE "Transactions on Electron Devices" vol. E–21, No. 2, Feb. 1974, pp. 146–155.

"Visual Psychophysics", D. Jameson et al., Springer–Verlag, 1972, pp. 78–83.

*Visual Psychophysics*, M. Alpern et al., pp. 43–49 and 54.

Patent Abstracts of Japan, vol. 13, No. 314, (P–899), Jul. 18, 1989 to Toshiba Corp.

D.P. Carmody et al., "Global and Segmented Search for Lung Nodules of Different Edge Gradients", Investigative Radiology, May–Jun. 1980, vol. 15, No. 3, pp. 224–233.

Patent Abstracts of Japan, vol. 10, No. 206 (P–478), Jul. 18, 1986 of JP 61–046930 to Ricoh Co., Ltd.

Patent Abstracts of Japan, vol. 16, No. 562 (P–1456), Dec. 3, 1992 of JP 42–14532 to Matsushita Electric Ind Co.

Patent Abstracts of Japan, vol. 17, No. 387 (P–1576), Jul. 20, 1993 of JP 50–66403 to Hitacchi Ltd.

Nehring et al., IEEE Transactions on Electron Devices, vol. ED–26, No. 5, May 1979, pp. 795–802.

T.N. Ruckmongathan, Conference Record of the 1988 International Display Research Conference, Papers presented at Hyatt Islandia, San Diego, California, Oct. 4–6, 1988.

H. Hamada et al., 1992 SID International Symposium, Digest of Technical Papers, First Edition, May 1992, pp. 269–272. "15.2: Brightness Enhancement of an LCD Projector by a Planar Microlens Array."

IBM Technical Disclosure Bulletin, vol. 33, No. 9, Feb. 1991, High Efficiency Back Light for LCD, pp. 261–262.

Werner E. Haas, *Liquid Crystal Display Research*: The First Fifteen Years, vol. Cryst. And Liq. Crys. vol. 94, pp. 1–31 (1983).

*Liquid Crystals, Nature's Delicate Phase of Matter*, by Peter J. Collings, Princeton University Press, 1990, Crystal 2, pp. 24–34.

Stephen Balter, et al., *Radiographic Viewing Conditions*, published in the conference proceedings of "Application of Optical Instrumentation in Medicine, 2nd Seminar," SPIE, 29–30 Nov. 1973 pp. 225–227.

J. Blair Hartley, *Film Viewing 1996*, (Ro–B1 20, Yr. 2/67), pp. 96 and 97.

Gerd Rosenbusch, Radiology in Medical Diagnostics, 1994, p. 465.

*Physiologishe Problems der Betrachtung des Rontgenbildes*, (Psychological Problems in Viewing Radiograph) by Rainer Rohler, dated 2/67, pp. 79 and 86–96 and English translation titled "Physiological Problems of Reading of Radiographs" (Ro–B1, 20 Yr. 2/67).

* cited by examiner

SELF-MASKING TRANSPARENCY VIEWING APPARATUS

CROSS REFERENCE TO RELATED APPLICATIONS

This application is a continuation of application Ser. No. 08/856,857, filed May 15, 1997, now U.S. Pat. No. 5,890,305 which is a continuation of application Ser. No. 08/358,603, filed Dec. 14, 1994, now abandoned, which is a continuation of application Ser. No. 07/861,982, filed Jun. 30, 1992, now U.S. Pat. No. 5,430,964, which is the U.S. National Stage of International Application No. PCT/EP91/00065, filed Dec. 17, 1990, which is a continuation-in-part of application Ser. No. 07/537,799, filed Jun. 14, 1990, now abandoned. The entire disclosure of each of these applications is considered as being part of the disclosure of this application, and the entire disclosure of each of these applications is expressly incorporated by reference herein in its entirety.

FIELD OF THE INVENTION

The present invention relates generally to a transparencies viewing device, more particularly, to apparatus for holding and illuminating X-ray and like transparencies.

BACKGROUND OF THE INVENTION

Medical X-ray transparencies usually are examined by placing them over the display area of a device commonly referred to as an illuminator. Conventional illuminators normally comprise a box-like structure enclosing fluorescent lighting tubes behind a semi-transparent light diffusing display plate defining the display area. Commonly, transparencies are retained on the surface of the display plate by pushing the upper edge of the transparencies under spring-loaded film-holder clips located along the top edge of the display plate.

Standard size illuminators have a display plate 17 inches high and 14 inches or multiples of 14 inches (i.e. 28 inches or 56 inches) wide. Usually, each 14 inch width of display plate has its own fluorescent tubes and control switch. Such display plates enable viewing full size X-ray films which measure 17 inches by 14 inches. In such cases, the sections of the display plate not covered by transparencies need not be illuminated. This eliminates unnecessary glare from areas outside the transparency.

When transparencies smaller than 14 inches by 17 inches are to be examined, they are typically retained on the display area in the same manner as full size transparencies, i.e., suspending them by means of the film-holders along the top of the viewer. This leaves a portion of the display area surrounding the transparencies fully illuminated and the resulting additional glare detracts from the visual perception of the person trying to study the transparency and assess the information it contains.

Often, transparencies contain several very transparent areas, and frequently, radiologists have to examine over-exposed transparencies. In these cases, considerable glare emanates through areas of the transparencies themselves.

An important factor in the interpretation of transparencies, is the ability to discriminate between various levels of light. This ability is determined by the Weber Law. E. H. Weber found that "the minimum perceptible difference in a stimulus is proportional to the level of the stimulus". Stated in terms of vision, as formulated by Fechner, $\delta L/L=K$ (Weber constant); Where $\beta L$ is the minimal detectable difference in luminance; and L is the luminance, see "Elemente der Psychophysic", G. T. Fechner, Leipzig, 1860, and "Visual Psychophysics", D. Jameson and L. M. Hurvich (ed.), Berlin, 1972.

Accordingly, if the eye is adapted to luminance L, $\delta L$ is determined. For a radiologist, maximal gray level discrimination is desired. Therefore, the observer's eye should be adapted to the luminance level of the image under study. In less benign conditions, a person reading an X-ray will be less able to perceive critical but minor shadings and nuances in the transparency. Moreover, protracted inspection of display areas under less benign conditions involves significant eye strain on the part of the observer.

While it is of course feasible for an observer to overlay masking strips on the display area and thus block unwanted and contrast-reducing light passing through the diffuser, as a practical matter, readers of X-rays rarely resort to such practice.

Attempts have been made in the past to provide viewing devices for X-ray transparencies which shield the eyes of the observer from light emanating from light sources other than the light passing through the transparencies, to obscure light in parts of the transparencies, and to reduce the contrast in transparencies when so required. However, these devices do not adapt the level of light to the transparency or to the sections being studied in the transparency.

In U.S. Pat. No. 1,988,654 to Haag, there is disclosed a light box which incorporates two manually movable curtains for masking all of the light transmitting surfaces of a diffuser up to the edges of a transparency.

U.S. Pat. No. 2,436,162 to Cadenas discloses an X-ray viewer having a masking arrangement incorporating a plurality of hingedly connected opaque masks which may be manually pivoted relative to each other to expose all or only selected parts of an X-ray transparency.

U.S. Pat. No. 4,004,360 to Hammond is directed to a self-masking viewing device which purports to automatically obscure areas of the viewing screen not occupied by the X-ray transparency. In accordance with such device, the screen is provided with a multiplicity of holes which may be selectively blocked by shutters or opened for the passage of light. The interior of the device is connected to a vacuum source which functions to hold the film against the front surface of the device.

The vacuum functions, in addition, to close the shutters connected with those of the holes not covered by the transparencies, so that passage of light through such holes is prevented. Air cannot pass through those of the holes in registry with the transparencies and, thus, the shutters associated with the covered holes remain open for the passage of light. The device described is unsuitable for critical X-ray transparencies inspection since the presence of holes and shutters in the viewing screen in the areas in registry with the transparencies creates a pattern behind the transparencies which interferes with the ability to accurately read them.

U.S. Pat. No. 4,373,280 to Armfield discloses an X-ray viewing plate having a cross bar for supporting transparencies at a central portion of the screen. A series of shades is provided which may be manually activated to obscure selected parts of the illuminated surface.

U.S. Pat. No. 4,510,708 to Porkinchak discloses an X-ray viewing device which includes a series of masks on an elongated scroll. In a specific embodiment, the scroll is moved by a motor on a pair of feed rolls. The masks are sized to correspond with stock sizes of X-ray transparencies. The apparatus has a dimensional sensing mechanism which aligns a selected mask with a positioned transparency automatically in accordance with the sensed dimension. The transparencies are inserted into a film-holder. The widthwise sensing function is performed by a series of levers or fingers positioned to encage an edge of the film.

U.S. Pat. No. 4,637,150 to Geluk describes a system in which a cathode ray tube is used as a light source and the light is light emitted by this source is modulated in accordance with the stored density of a a transparency. This system is impractical due to the limited sizes and associated light outputs for this type of illuminator.

SUMMARY OF THE INVENTION

The apparatus of the present invention comprises an illumination means typically provided as a conventional primary illuminator, which can be a battery of fluorescent bulbs and reflectors mounted on a chassis, or contained in a box-like structure. Additionally the apparatus comprises a mask pattern generating device, which may be an electrically-controlled Liquid Crystal Array (LCA). In addition, there is provided a transparency detection system, such as optical sensors which recognize optical properties, such as attenuation, on the display area including areas covered by transparencies and the face of the transparencies themselves. The detection data is transferred to a system control unit, which drives the LCA to produce a complementary masking pattern in conformity with the displayed transparencies, masking all other areas of the display area.

In one or more alternative embodiments of the present invention, the LCA is provided in several layers, or includes rectangular segments, or combination thereof. The LCA layer or layers may be arranged in the pattern of a matrix or matrices where the size of a matrix cell is larger than 4 mm$^2$. The LCA may include an active matrix type. Alternatively, the LCA segments may be a plurality of segments in the shape of parallel stripes, wider than 2 mm, across the display area. The stripes may also be divided across into shorter segments.

In a particular embodiment, at least two LCA layers are provided segmented in substantially dissimilar fashion. The LCA itself may be a Polymer Dispersed Liquid Crystal.

In another particular embodiment, the mask pattern generating device may be one or more Thermo-Optical Liquid Crystal devices.

In still another particular embodiment, the LCA may be replaced by one or more Electrochromatic Metal Oxide devices.

In another particular embodiment, the detection of loci occupied by transparencies or parts thereof in the display area is realized through the operation of electro-optical detection means, using differences in attenuation and/or reflection of light to sense differences between the loci of transparencies or parts thereof and between other areas of the display area.

In yet another particular embodiment, the detection system is realized through the operation of one or more geometric gauges, which sense thickness, and/or length, and/or width of said transparency, thus differentiating between loci of transparencies or parts thereof, and between other areas of the display area.

In another particular embodiment, the detection system is provided by the operation of one or more sets of electric contacts, including specifically sets of contacts positioned in or adjacent to the film-holders. The electric conductivity state of said contacts is changed through the isolating effect of the transparency or parts thereof in some of the contacts, thus indicating the location of the transparency.

In yet a further particular embodiment, the detection system is provided by the operation of one or more acoustic transmitting and detection means, which sense differences in acoustic properties between loci of transparencies and between other areas of the display area.

In still another particular embodiment, the detection system is provided by the operation of one or more capacitance detection systems, comprising an array of electrodes and associated electronic circuitry. The associated electronics sense changes in capacitance between electrodes, including between neighboring electrodes, including change in capacitance caused through the presence of transparency or parts thereof.

In a preferred embodiment, which includes electrically-operated LCA segments and a capacitance detection system, the array of LCA electrodes includes electrodes of the detection system.

In another particular embodiment, the detection system is provided by the inclusion of a manual command for control of electric control means. In this embodiment, sensors detect position or positions indicated by the operator, and specifically positions on, and/or adjacent to, the transparencies.

In another preferred embodiment, the positioning of reference positions of transparencies, such as a corner of a transparency, is limited to pre-indicated locations in a display area. Since transparencies have dimensional standard sizes, this embodiment simplifies the detection of loci occupied by transparencies, and simplifies the positioning of sensors, so as to reduce and determine the patterns of the LCA segments.

A feature of the present invention which further improves visual perception of details of a transparency, is the provision of a Region Of Interest (ROI) mode of operation. The ROI may include selection of one or more areas of the display area or the transparencies where relative enhancement of light transmission and/or one or more areas where relative reduction of light is required. In the ROI, the selected areas will have relative enhancement of light transmission, while in other selected areas light transmission will be reduced, in one or more degrees.

In a preferred embodiment, the electro-optical detection includes mapping of light attenuation and/or light reflection on the transparencies. The mapping of transparencies is useful to attain greater uniformity of light emanating from said transparencies, in addition to the reduction of light in areas of the display area, through relative reduction of light transmitted to more transparent parts of the transparencies and to other parts of the display area.

In another particular embodiment, the viewing device may have attached to it an apparatus for change of transparencies from a magazine where the transparencies are brought laterally from the magazine to the display area, variously known as a film alternator or motorized viewer. In such an alternator, sensing of incoming transparencies and their scanning is carried out during transport of transparencies into the magazine or from the magazine to their station in the display area. The scan uses the lateral motion of the transparencies to detect loci of transparencies on the display area and/or to detect spatial distribution of light transmission of the transparencies and/or of parts thereof.

In a further particular embodiment, the scanning may be used to attain greater uniformity of light emanating from the transparencies, in addition to the reduction of light in areas of the display area, through the LCA effecting relative reduction of light transmitted to more transparent parts of the transparencies and to other parts of the display area.

In a further embodiment, the sensors detect an operator indication, pointing via the fingers or otherwise, to distinguish between instructions to enhance or reduce light in the ROI in accordance with an operator-selected mode.

In another embodiment, the Manual Control Mode is realized by inclusion of a touch screen device using an Optical, and/or a Capacitive, and/or a Resistive, and/or a Pressure Membrane, and/or a Load Sensitive (Piezoelectric) Surface, and/or an Acoustic Wave touch screen method. The touch screen may be provided in, or adjacent to the display area of the viewing device to detect, within the viewing field of the viewing device, a position or positions indicated by the operator, including specifically positions on, and/or adjacent to, the transparencies, to activate the LCA or other system mask pattern generation accordingly.

In a preferred embodiment, the touch screen is used to convey the operator's indication in order to attain variation of light distribution adapted to the wishes of the observer.

In another embodiment, the relative light transmission in an area spreads or contracts in planar fashion in response to a prescribed indication.

In another preferred embodiment, specified, or otherwise indicated regions of interest will receive an amount of illumination commensurate with the wishes of the radiologist.

It is another feature of the present invention that the intensity of light emanating from the primary illuminator is made spatially nonuniform, functionally related to the loci of transparencies or parts thereof in the display area.

It is still another feature of the present invention that the viewing device includes control of the relationship between illumination of the viewing room and the transparencies.

In still another embodiment, the illumination means comprises a primary illuminator which includes a mask, positioned on or adjacent to the light sources, transmitting less light in the direct light path from the light sources to the observer.

In a further embodiment, the mask included in the primary illuminator has light reflecting areas facing the light sources and has more closely knit reflective surfaces in the path of direct light from said light sources to the observer.

In another application, instead of a viewing device, a projection device is provided, for projecting on to a screen images from transparencies such as photographic transparencies, slides or drawings. A segmented LCA affords relative dimming of parts of the projected field, through electro-optical modulation of the light transmission by electric means.

In still another application, the device is provided as a microscope. A segmented LCA affords relative reduction of light in parts of the transparency, through electro-optical modulation of the light transmission by electric means.

In another embodiment, the LCA is comprised of a liquid crystal material and associated electrodes applied to at least one plastic substrate.

Thus, the invention achieves considerable conformity of the luminance of the environment to the luminance of the area under study, resulting in a significant improvement of visual perception of the detail to be studied, and approximating the optimal viewing conditions in accordance with Weber's Law.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

As described herein, the present invention employs several sub-systems and encompasses for some of them several alternative methods of operation, thus resulting in a large number of permutations. This detailed description illustrates a few such embodiments and variations according to the invention. Other combinations are also useful and fall within the scope of the invention.

Figure 1:
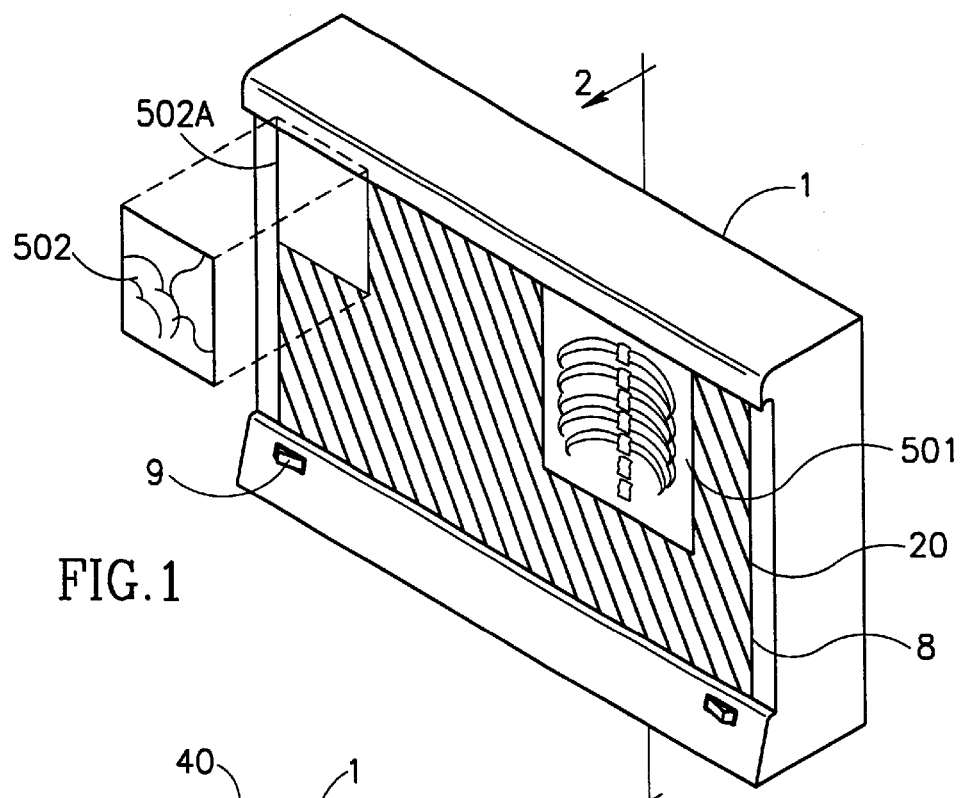
FIG. 1 is a perspective view of a viewing device constructed and operated in accordance with the principles of the present invention, provided with a Masking Pattern Generator, a transparencies detection means and two transparencies.
Figure 2:
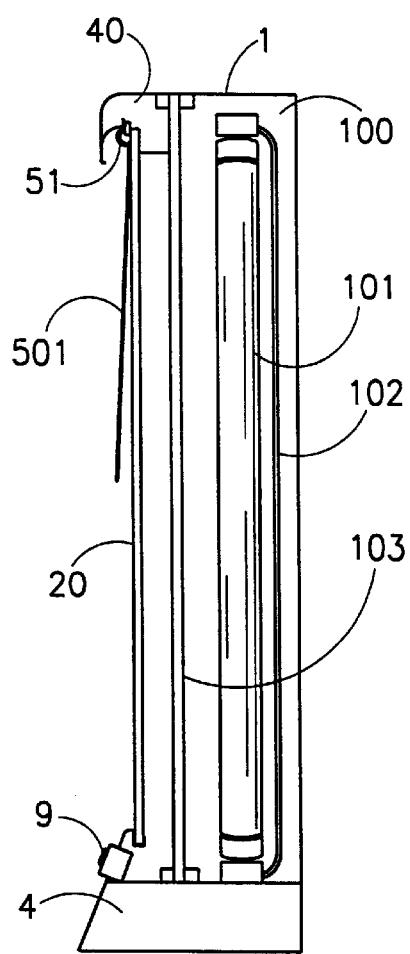
FIG. 2 is a cross-section of the viewing device of FIG. 1, showing a primary illuminator comprising light source and reflectors, a Masking Pattern Generating device, a film-holding clip, a transparency detection means, an Electronic Control Unit and a transparency.
Figure 3:
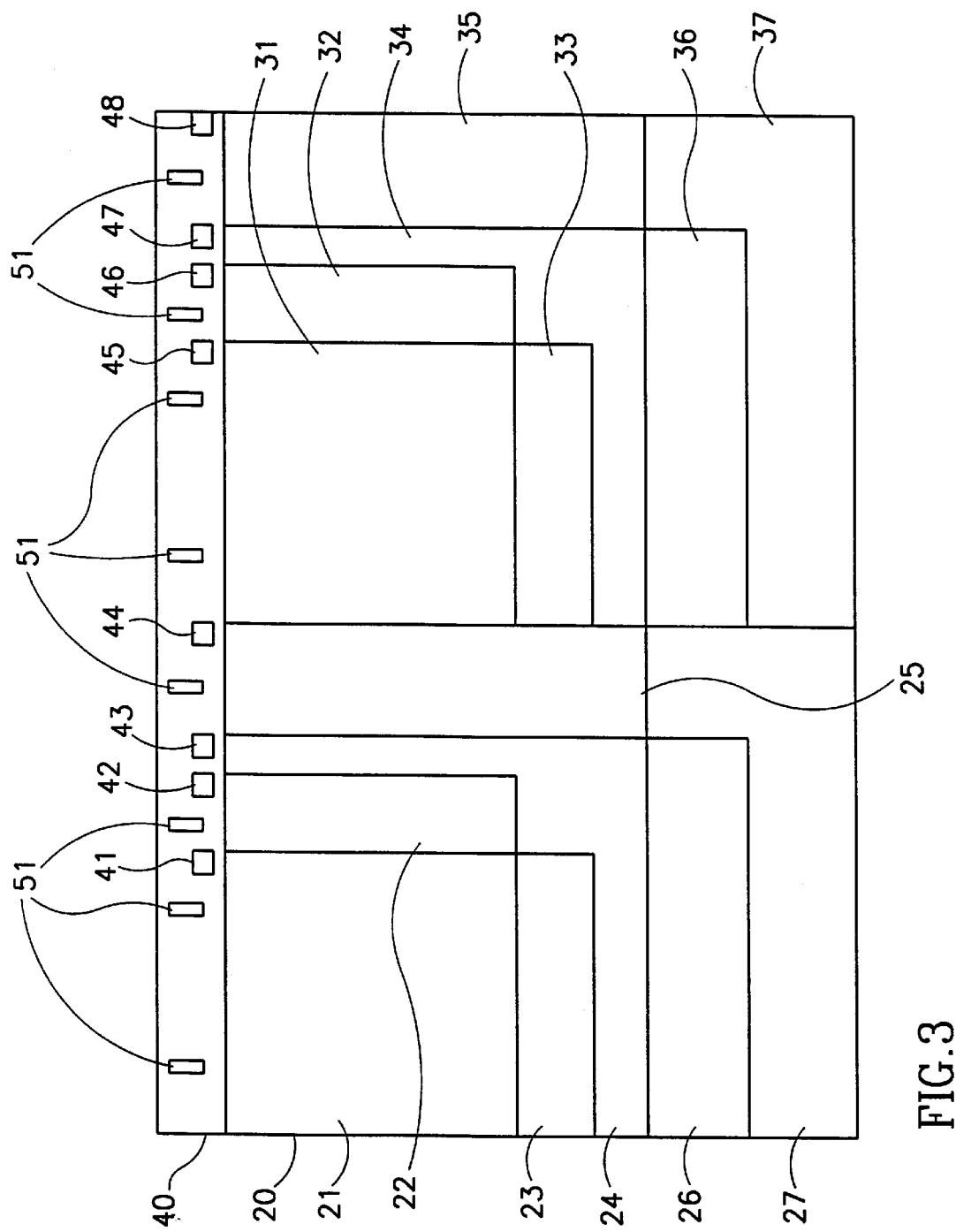
FIG. 3 is a front view of the Masking Pattern Generator, including film-holders and a transparency detection system which uses pre-indicated set locations for reference locations of the transparencies.

Referring now to FIG. 1, there is illustrated an embodiment of a viewing device 1 constructed in accordance with the present invention. Viewing device 1 has a display area 8 sufficiently large that two X-ray transparencies 501 and 502 can be simultaneously presented for inspection. A cross-sectional view of viewing device 1, taken along section lines 2—2 is illustrated in FIG. 2. Device 1 includes a primary illuminator 100 as an illumination means, comprising fluorescent bulbs 101 as a light source, reflectors 102, and a diffuser plate 103. Viewing device 1 also includes a power switch 9. The specific embodiment illustrated in FIGS. 1–4 is useful for standard sizes of transparencies. In this embodiment, the positioning of reference location of transparencies 501 and 502 on device 1 is in pre-indicated positions, e.g., the transparencies upper left corners.

The front part of device 1 includes an Electro-Optical Masking Device (EOMD) 20. As best seen in the front view of FIG. 3, the EOMD is embodied in a Liquid Crystal Array (LCA), including segments 21 through 37. In the embodiment illustrated here, transparencies 501 and 502 are held for display by film-holders 51. The loci of the transparencies in the display area is recognized by sensors 41 through 48 which in these illustrations are situated in sub-assembly 40. In a preferred embodiment of the invention each sensor comprises a set of electrical contacts which are separated by the presence of the transparency. In another preferred embodiment of the invention the sensors are acoustic sensors which are covered by the transparency when it is present. Ultrasonic waves emitted by a speaker (not shown) are attenuated by the transparency indicating its presence.

Figure 4:
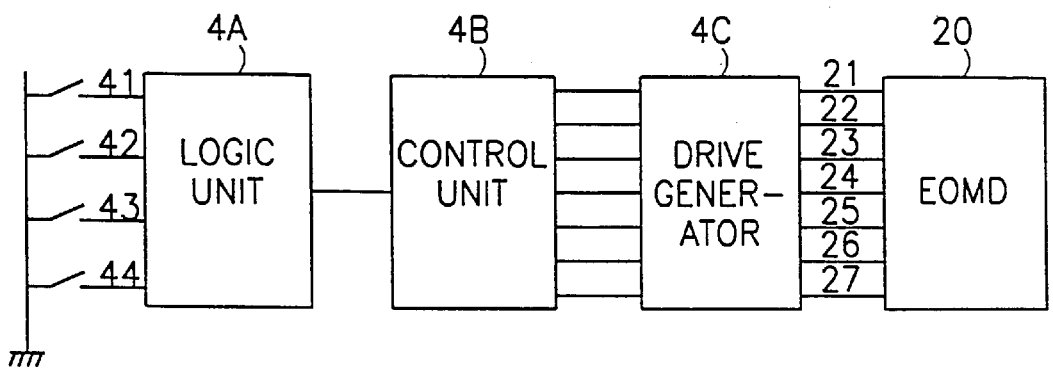
FIG. 4 is a block diagram of the electronic circuitry featuring the transparency detection system of the embodiment of FIG. 3.

Viewing device 1 has a left-hand module comprising an Electric Control Unit 4 which is illustrated in the Electronic Block Diagram of FIG. 4, including sensors 41 through 44, embodied in electric contacts, and determining the state of the LCA segments 21 through 27. The electronic blocks of FIG. 4 include electronic logic unit (block 4A) identifying a loci of transparencies, logic control unit (block 4B), and LCA Drive Generator (block 4C). An identical module to the one seen in FIG. 4 includes sensors 45 through 48 and LCA segments 28 through 37. Each such segment is individually controlled by an LCA Drive Generator which is in block 4C.

As is evident to a person skilled in the art by inspection of FIGS. 1–4, the LCA 20 blocks light emanating from the primary illuminator 100, if no transparencies are mounted. When, for example, a transparency 502 is mounted on the left-hand upper corner of viewing device 1, only the sensor 41 is activated. Therefore, Logic Control Unit 4B interprets this activation according to the pre-set Truth Table 1 (below), as a vertical placement of an 8"×10" transparency at the upper left corner of the left module.

TABLE 1

TRUTH TABLE.

|   | Film Size | Film Orientation | Sensors Activated | LCA Segments Activated |
|---|---|---|---|---|
| A | 8" × 10" | Vertical | 41 | 21, 23 |
| B | 8" × 10" | Horizontal | 41, 42 | 21, 22 |
| C | 11" × 14" | Vertical | 41, 42, 43 | 21, 22, 23, 24, 26 |
| D | 11" × 14" | Horizontal | 41, 42, 43, 44 | 21, 22, 23, 24, 25 |
| E | 14" × 17" | Vertical | 41, 42, 43, 44 | 21, 22, 23, 24, 25, 26, 27 |

Accordingly, the Logic Control Unit 4B commands Drive Generator 4C to turn segments 21 and 23 into a light transmitting mode. On the left-hand module of device 1, the area 502A, which is the area covered by transparency 502, is uniformly illuminated. Similarly, transparency 501 activates a masking pattern on the right-hand module of device 1. As will be appreciated, the observer of transparencies 501 and 502, can examine these transparencies free of any glare from other parts of the display area of viewing device 1. Similarly, different sizes or orientations of transparencies would activate other LCA segments in accordance with Table 1, thus providing masking patterns registering with the loci of the transparencies on display.

Figure 5:
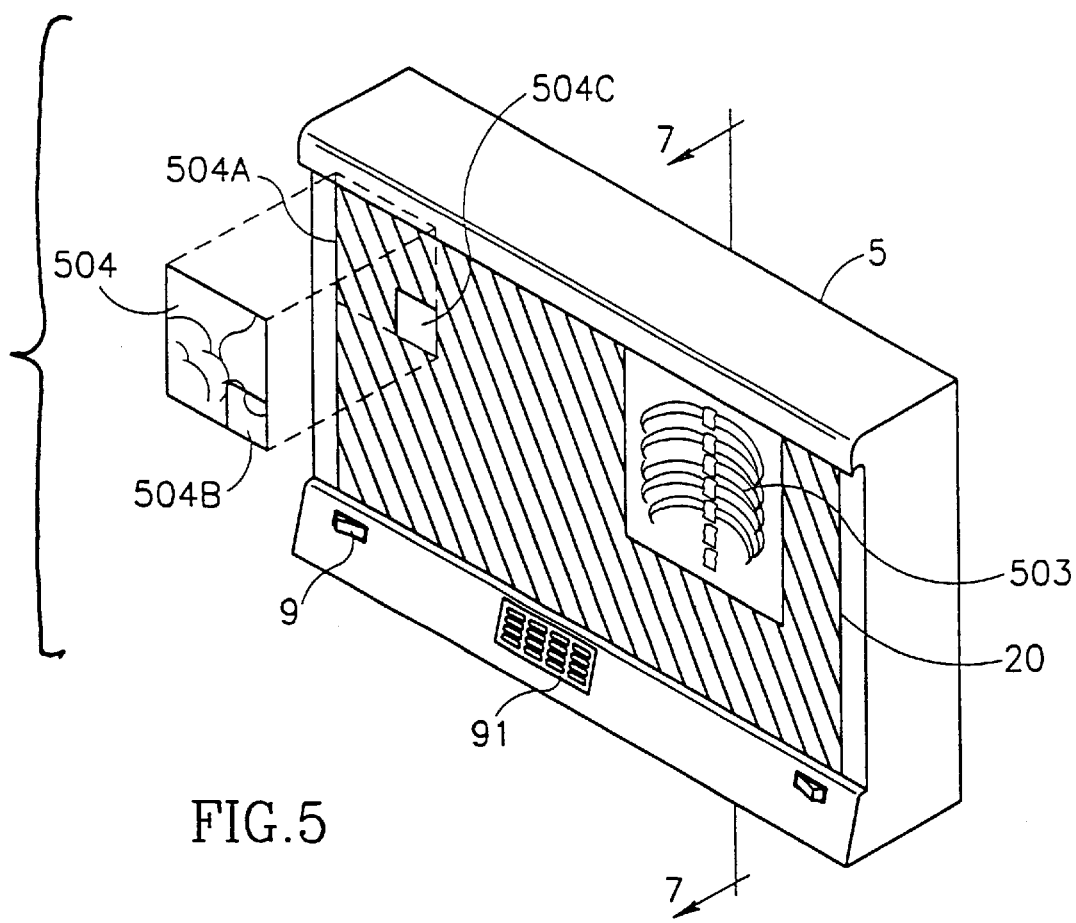
FIG. 5 is a perspective view of an alternative embodiment of the viewing device of FIG. 1, provided with a Masking Pattern Generator, a transparencies detection means, Touch Screen, two transparencies and a Region Of Interest (ROI)
Figure 6:
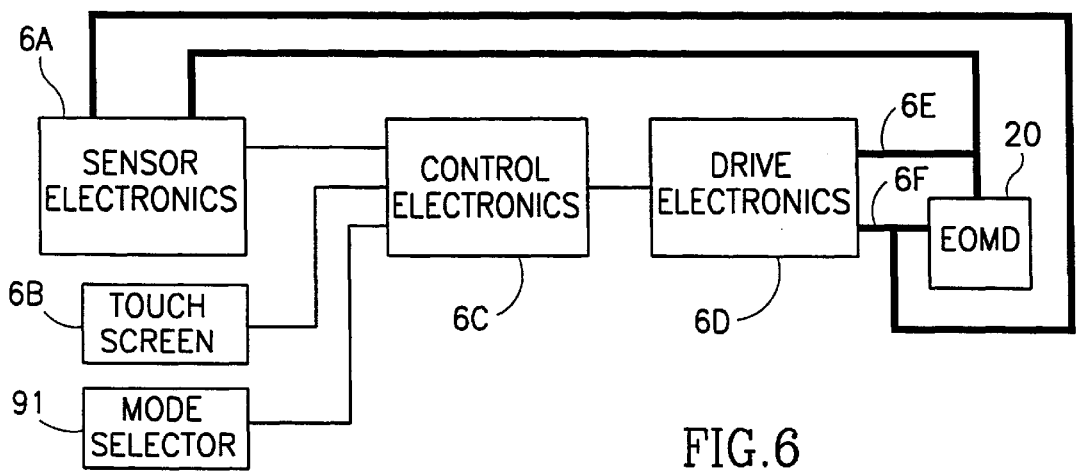
FIG. 6 is a block diagram of the electronic circuitry featuring the matrix LCA Masking Pattern Generator and Touch Screen of the embodiment of FIG. 5.
Figure 7:
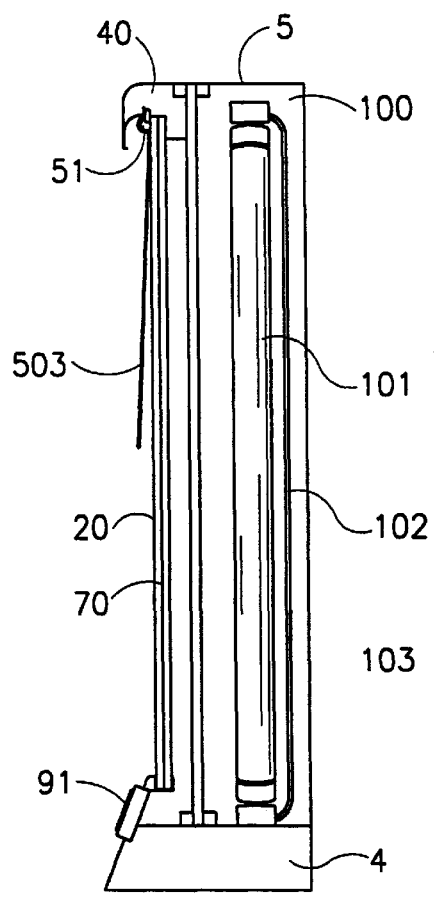
FIG. 7 is a cross-section of the viewing device using the matrix LCA Masking Pattern Generator and Touch Screen of FIG. 5, and showing the primary illuminator.

Another embodiment of the invention is illustrated as a viewing device 5 in FIG. 5, and a cross-section taken along section lines 7—7 is illustrated in FIG. 7. The EOMD 20 is an LCA Mask Pattern Generator, illustrated in FIG. 8, segmented into a matrix. The blocks of the Electronic Block Diagram of FIG. 6 include Capacitive Sensor Electronics (block 6A), a Touch Screen Device (block 6B), Control Electronics (block 6C), and Drive Electronics (block 6D).

The detection of loci of transparencies 503 and 504 is achieved through capacitance changes between electrodes of the LCA in the loci where transparencies 503 and 504 are present. The LCA matrix is an active matrix and as illustrated in the Block Diagram of FIG. 6, wiring bus 6E and 6F control the columns and rows of the active matrix respectively, and drive Capacitive Sensor Electronics (CSE) 6A. The CSE 6A measures changes in inter-electrode capacitance and determines therefrom the loci of transparencies 503 and 504. This data is fed into the Control Electronics 6C, and the Control Electronics 6C commands Drive Electronics 6D to activate light transmission at the loci of the transparencies.

Touch Screen space 70 is a Pressure Membrane Touch Screen device. Thus for example, if the observer of transparencies wants to study a Region Of Interest (ROI) 504B in transparency 504, and desires to have only that ROI 504B lighted, the observer would indicate an outline of his ROI 504B, within space 70, after switching to ROI Mode in Mode Selector 91. The operator indication activates Touch Screen Device 6B which, in turn, reports the locus of ROI 504B to Control Electronics 6C, resulting in the masking of light by the LCA 20 in all areas of display, except 504C (FIG. 5), which is the ROI. Similarly, the Mode Selector 91 can select a Dim Mode, a Area Contract Mode, or an Area Explode Mode, whereby the Touch Screen Device 6B, Control Electronics 6C and LCA 20, are operative to dim the light in the ROI, or to contract or explode the area of the ROI, respectively.

Turning now to FIGS. 9 through 12, another embodiment of the invention is illustrated. The viewing device 11 in FIG. 9 has attached thereto an apparatus for change of transparencies, in which the transparencies are brought laterally from the magazine area, typically located inside device 11, to the display area 620. An optical bar scanner 640 utilizes the lateral motion of the transparencies to anticipate the spatial distribution of light in the whole of double display area 620. The loci of transparencies 505 through 508 and the optical transmission of parts thereof are registered and serve to control LCA plate 620.

Figure 10:
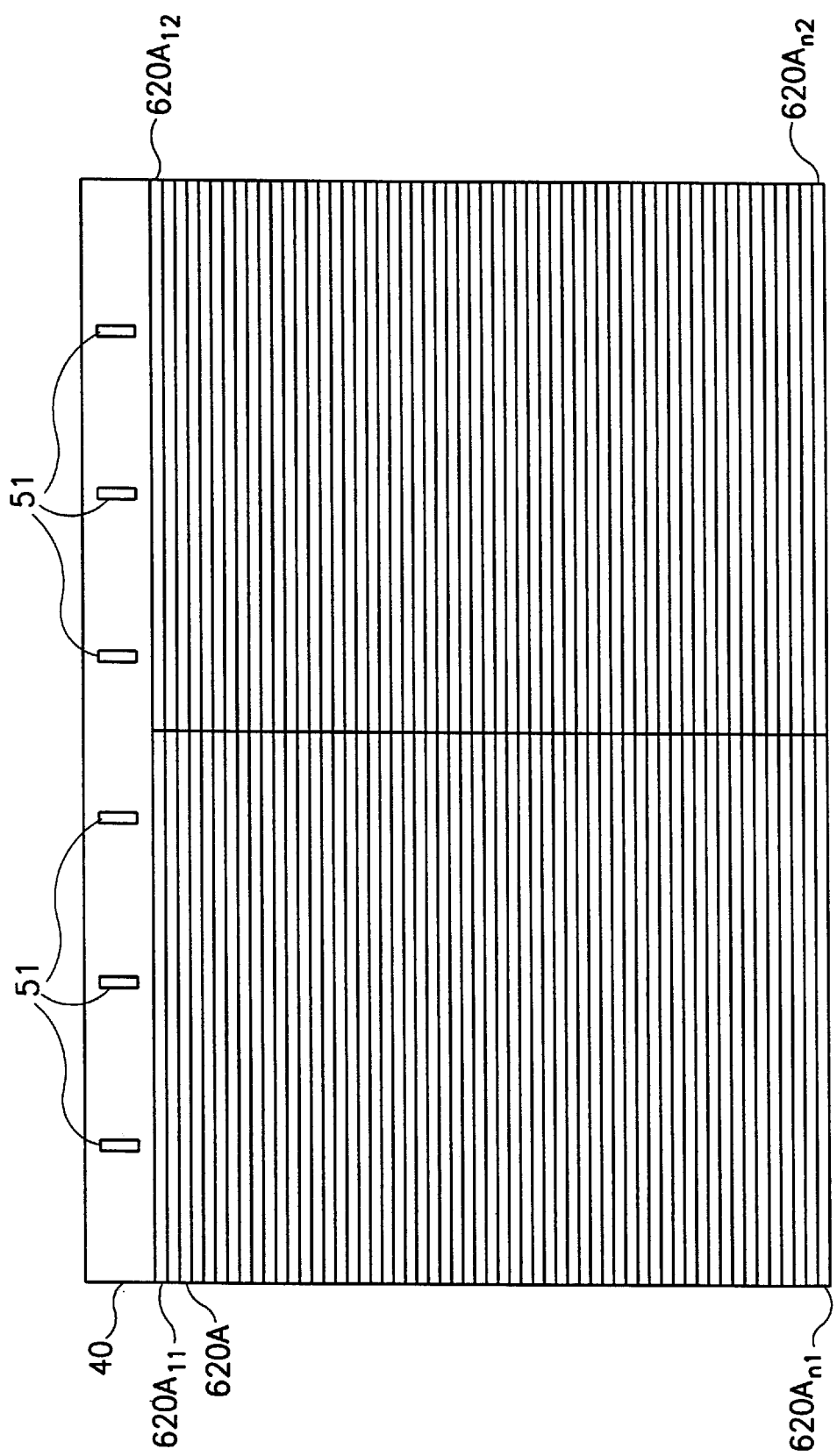
FIG. 10 is a front view of an LCA Masking Pattern Generator using a segmented horizontal stripe pattern, and including film-holders.
Figure 11:
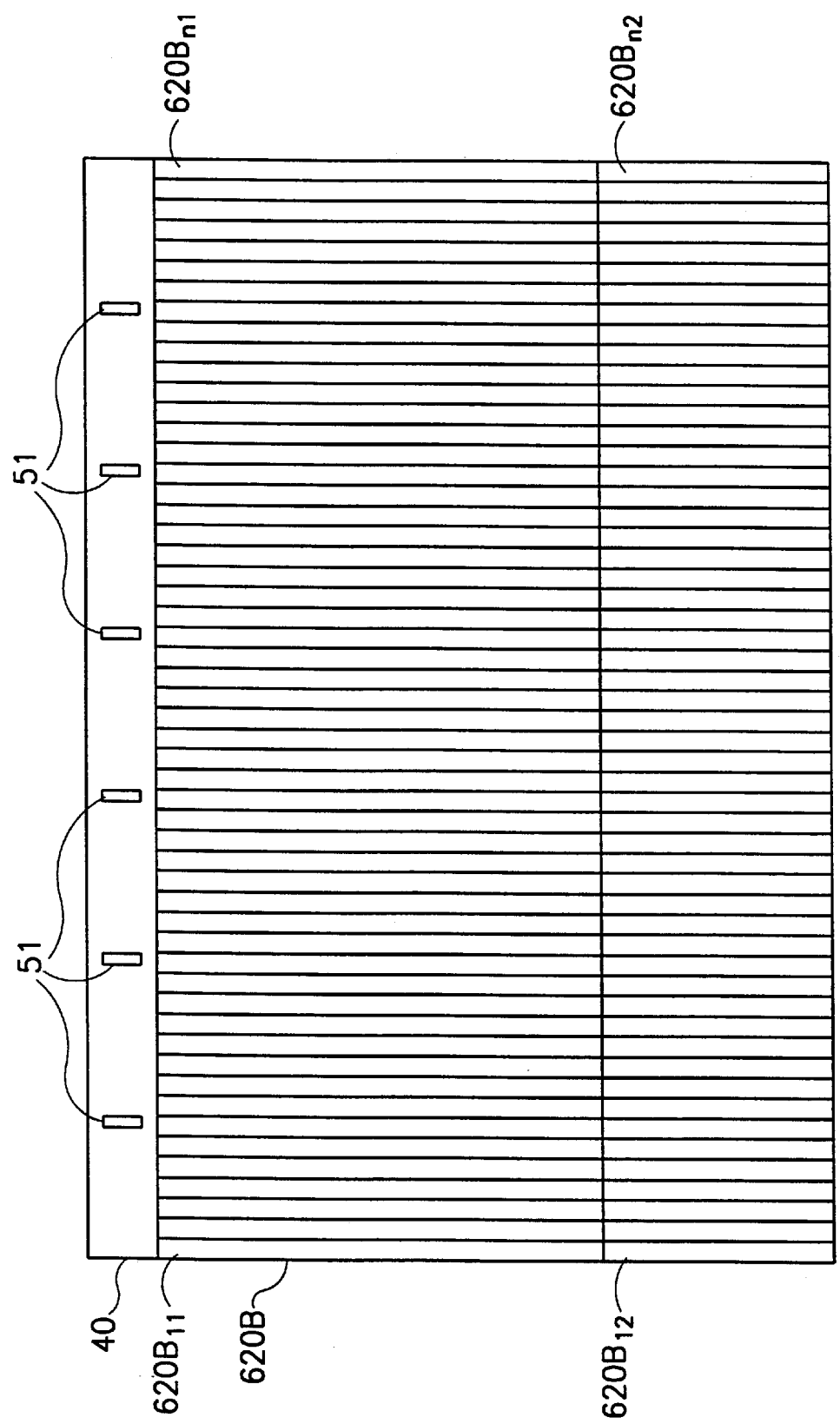
FIG. 11 is also a front view of an LCA Masking Pattern Generator using segmented vertical stripe pattern, and including film-holders.

In FIGS. 10 and 11, a particular embodiment of LCA plate 620 is illustrated. The LCA 620A in FIG. 10 is segmented to horizontal parallel stripes $620A_1$ through $620A_j$ to $620A_n$, across the plate. Each stripe is divided across into two segments $620A_{11}$, $620A_{12}$, ... $620A_{n1}$, $620A_{n2}$. The LCA plate 620A is mounted in front of, and adjacent to LCA Plate 620B illustrated in FIG. 11, which is segmented into vertical parallel stripes $620B_1$ through $620B_j$ to $620B_n$ across the plate, and in which each stripe is divided across into two segments, creating segments $620B_{11}$, $620B_{12}$, . . . $620B_{n1}$, $620B_{n2}$. Jointly the two LCAs 620A and 620B achieve a matrix effect of the EOMD. The data is relayed by Bar Scanner 640 to the Control Electronics 12C, and the Control Electronics 12C commands Drive Electronics 12D to activate light transmission in the rows of LCA 620A and in the columns of LCA 620B which correspond to the loci of transparencies 505 through 508. Preferably the width of the stripes is greater than 2 mm each.

In a preferred embodiment of the invention control electronics 12C is utilized to calculate the average transmission of light through the transparency. The term "average transmission" as used herein is an overall transmission value to which the vision of the observer adapts. This value is fed to Drive Electronics 12D which now functions to adjust the attenuation of the LCA elements outside the area of the transparency to provide a light level outside the area of the transparency which is substantially equal to the average light level over the transparency. This "gray" border provides better adaptation of the eye to the average light level of the transparency.

In a further improvement, Control Electronics 12C is operative to control the room lighting to provide for even better adaptation of the eye to the transparency light level.

Figure 8:
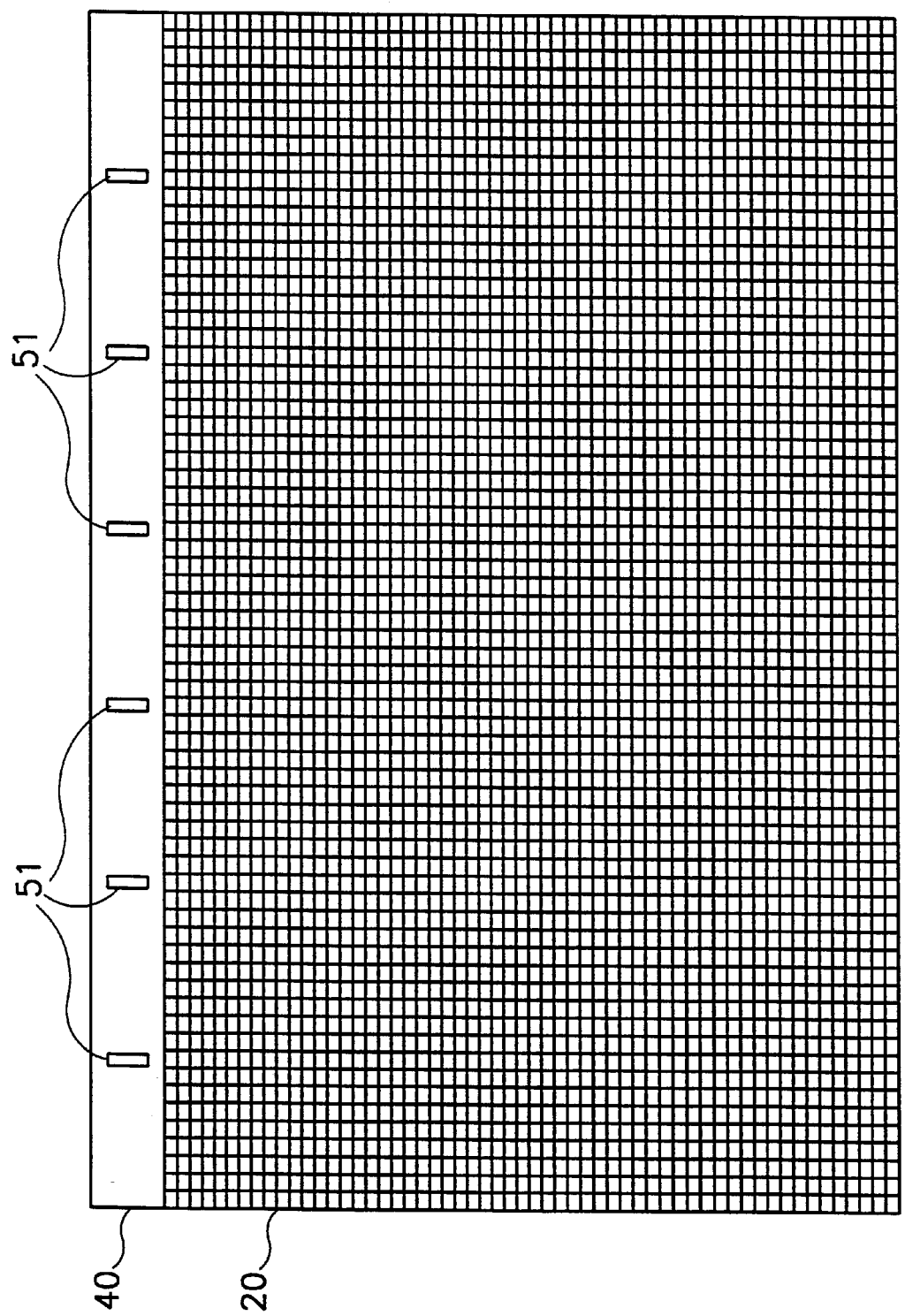
FIG. 8 is a front view of a matrix LCA Masking Pattern Generator of FIG. 7, including film-holders and transparency detection system.
Figure 9:
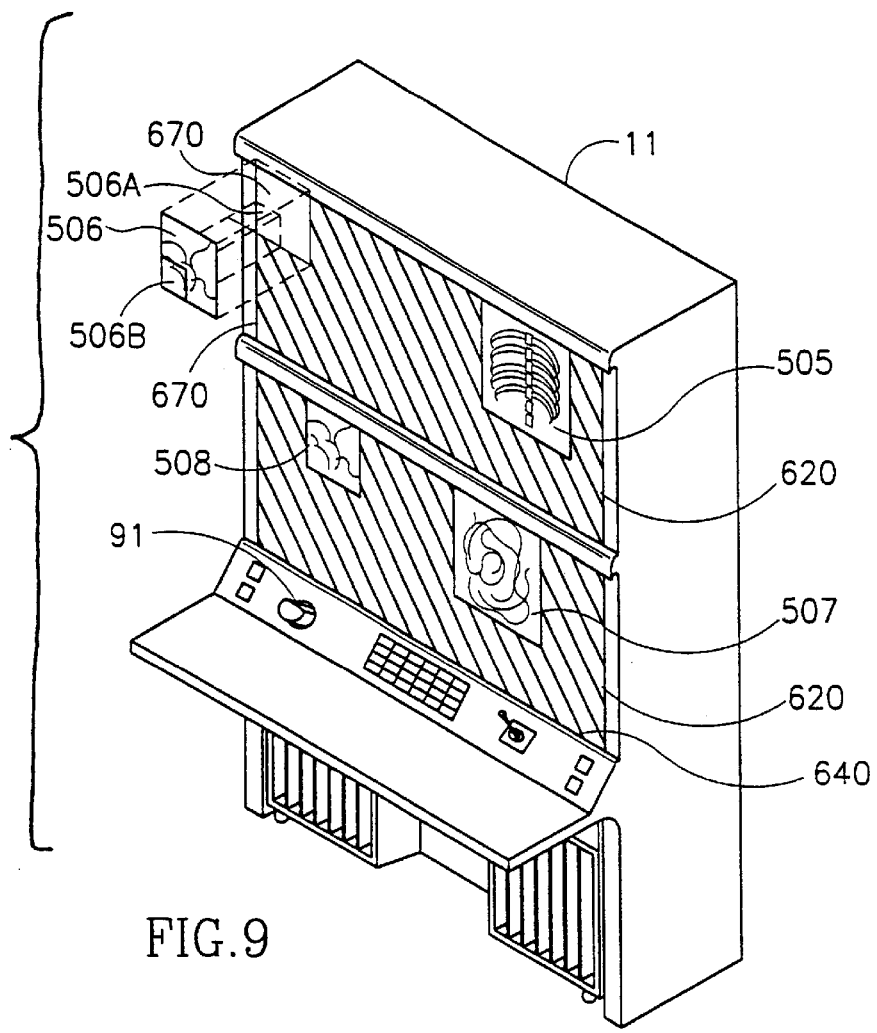
FIG. 9 is a perspective view of an alternative embodiment of the viewing device of FIG. 1, featuring an attached motorized Transparencies Changer provided with a Masking Pattern Generator, a Bar Scanner, a Touch Screen, four transparencies and an ROI.
Figure 12:
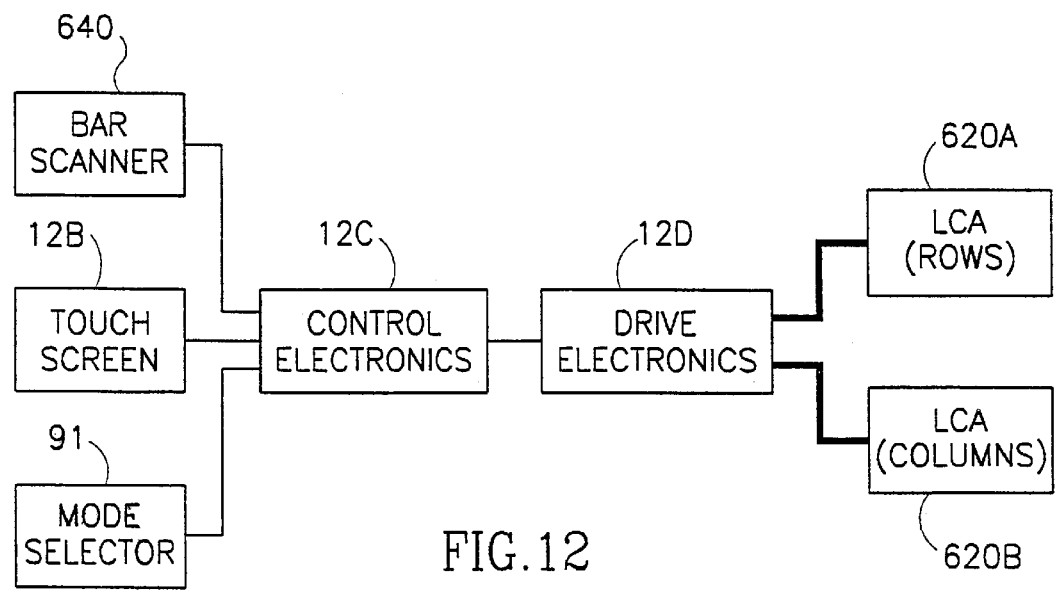
FIG. 12 is a block diagram of the electronic circuitry of the embodiment shown in FIGS. 9 through 11, using an Optical Bar Scanner, two LCA plates each of which is segmented in a stripe pattern, and combining a Masking Pattern Generator and a Touch Screen.

In a further improvement a mask pattern generator having a matrix segmentation similar to that of FIG. 8 is used in the apparatus of FIG. 9. The matrix elements are individually addressable by Drive Electronics 12D which is operative to adjust the level of transmission of the LCA to any one of a plurality of different levels. Control Electronics 12C transmits signals to Drive Electronics 12D, based on the values of transmission for elemental areas of the transparency, to adjust the transmitted light level outside the transparency to the average light level over the transparency, and to vary the light level over the transparency, such that the different areas of the transparency have similar light transmissions. Since the matrix is much coarser (preferably each element has an area of greater than 4 mm$^2$) than the details to be detected on the transparency these variations do not obscure these details, rather they allow for better visualization of the details due to better eye adaptation.

In order to reduce a checkerboard effect which may be present in this embodiment, preferably the EOMD includes a layer of diffuser type liquid crystal, which is operative on command to change state from a transparent state to a diffuser state.

Figure 13:
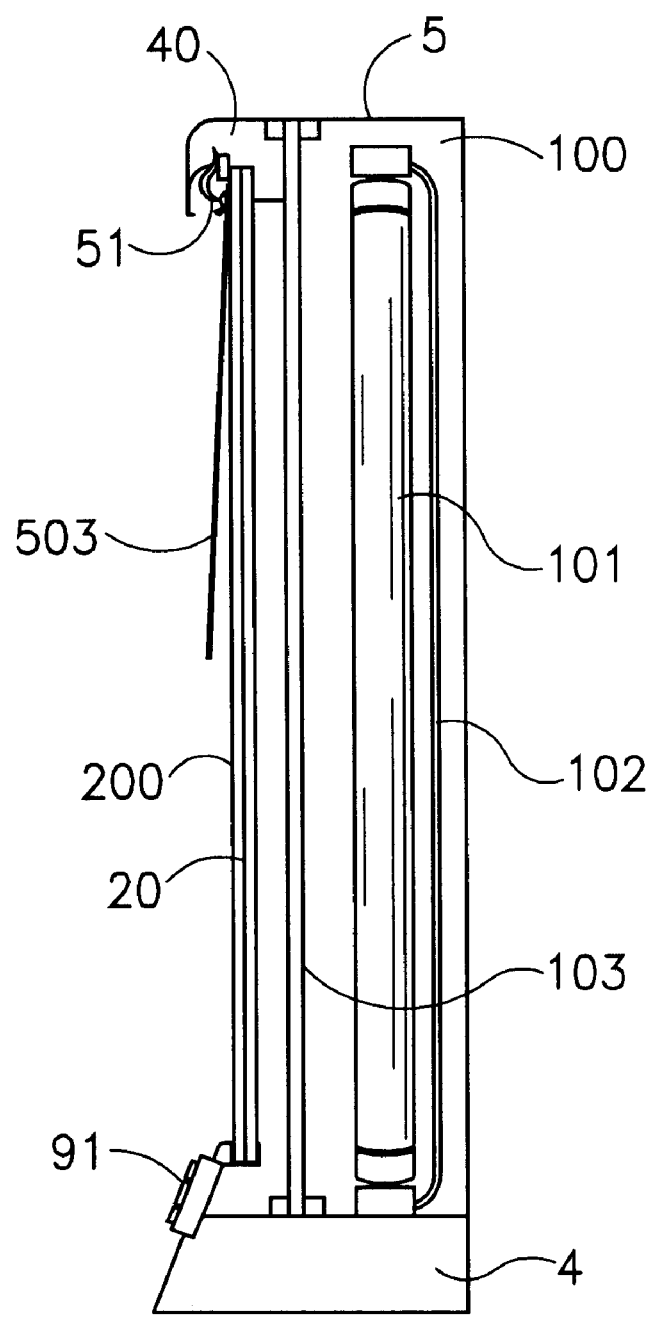
FIG. 13 shows a cross-sectional view of a device according to a preferred embodiment of the invention in which two layers of liquid crystal devices are used.

FIG. 13 shows a cross-section view of a device in which two layers of liquid crystal are employed. In one embodiment of the invention, the inner layer of liquid crystal 20 has the configuration shown in FIG. 10 and the outer layer 200 has the configuration shown in FIG. 11. In a second embodiment of the invention, the outer layer is a liquid crystal having selective transparent and diffusing states. In a third embodiment of the invention both layers 20 and 200 have the same array configuration.

When Mode Selector 91 is in ROI mode, an indication by the observer of transparencies of an outline of ROI 506B in transparency 506 for example, within space 670 will activate Touch Screen Device 12B which, in turn, reports the locus of ROI 506B to Control Electronics 12C. This in turn relates the data to the mapped light distribution in the transparencies 505 through 508, effecting the masking of light by the LCA 620A and 620B in all areas of display, except 506A, which is the ROI. Similarly, if the Mode Selector 91 is in Dim Mode, or in Area Contract Mode, or in Area Explode Mode, the Touch Screen Device 12B, Control Electronics 12C and LCA 620A and 620B, are used to dim the light in the ROI, or to contract the area of the ROI, or to explode the area of the ROI, respectively.

While the invention has been generally described in embodiments where the EOMD comprises a LCA (which in a preferred embodiments is a Polymer Dispersed Liquid Crystal or a Thermo-Optical Liquid Crystal), an Electrochromatic Metal Oxide device, or other suitable device having variable transmission is possible. Furthermore a number of layers of any of such devices may be used having similar or different segmentation arrangements.

Furthermore the illuminator can be a segmented flat sheet light emitting device or an array of light emitting devices whose intensity is spatially varied in accordance with the principles described above using the various detection apparatus described to determine the intensity of various parts of the light source.

While the invention has been described for direct viewing backlighted embodiments, other embodiments of the invention are possible using the same inventive ideas. For example, in a projector for transparencies a mask generator can be provided adjacent to the transparency for masking the transparency and its surroundings to improve uniformity and visual adaptation. Further, the mask generating means can be made part of a microscope, again to improve uniformity and visual adaptation.

Although various embodiments, forms and modifications have been shown, described and illustrated above in some detail in accordance with the invention, it will be understood that the descriptions and illustrations are offered merely by way of examples, and that the invention is not limited thereto but encompasses all variations and alternatives falling within the scope of the appended claims and is to be limited in scope only by these appended claims.

What is claimed is:

1. A method of facilitating viewing a transparency by an observer comprising:
    mounting a transparency, having a display area, in front of a display surface;
    providing backlighting toward said display surface;
    indicating, by an observer, of a portion of the transparency that is smaller than the area of the transparency;
    selecting a pattern of relative back illumination for the transparency in response to said indication; and
    masking the backlighting, prior to its illuminating the transparency, utilizing a plurality of addressable liquid crystal elements, to provide different relative illumination in said portion of the transparency relative to other portions of the display area whereby visual perception of the transparency in said portion of the transparency is improved.

2. A method according to claim 1 comprising increasing or reducing illumination in said portion of the transparency.

3. A method according to claim 2 comprising expanding or contracting the portion having said different relative illumination in response to a command by the operator.

4. A method according to claim 3 wherein the command comprises touching of the transparency by the operator.

5. A method according to claim 2 comprising moving borders of said portion of the transparency in response to a command by the operator.

6. A method according to claim 5 wherein the command comprises touching the transparency by the operator.

7. A method according to claim 6 and comprising mapping the opacity of the transparency and masking the backlighting responsive to said mapping.

8. A method according to claim 6 and comprising diffusing the backlighting prior to masking.

9. A method according to claim 4 wherein diffusing comprises passing the backlighting through a liquid crystal device having selectively a transparent and a light diffusing state.

10. A method according to claim 9 wherein masking comprises passing the backlighting through at least two liquid crystal layers.

11. A method of facilitating viewing a transparency mounted on a viewbox, the viewbox including apparatus for determining loci of a transparency mounted on a display area thereof, by an observer comprising:

mounting a transparency, having an area in front of said display area;

determining, by the apparatus of at least one loci of a transparency when a transparency is mounted in front of said display area;

providing backlighting toward said display area;

indicating, by an observer, of a region of interest of the transparency that is smaller then the area of the transparency;

selecting a pattern of relative back illumination for the transparency in response to said indication; and masking the backlighting, prior to its illuminating the transparency utilizing a mask generator having no moving parts, to provide different relative illumination in said region of interest of the transparency relative to other portions of the display area whereby visual perception of the transparency in said portion of the transparency is improved.

12. A method according to claim 11 wherein said mask generator increases or reduces illumination in said region of interest.

13. A method according to claim 12 wherein said increase or decrease in illumination is in response to an indication by the observer.

14. A method according to claim 13 wherein said indication by the observer comprises touching the transparency.

15. A method according to claim 13 wherein said indication by the observer comprises touching the transparency.

16. A method according to claim 11 wherein said mask generator expands or contrasts an area of said region of interest, responsive to an indication by the observer.

17. A method according to claim 11 wherein masking comprises passing the backlighting through at least two liquid crystal layers at least one of which comprises a plurality of addressable liquid crystal elements.

18. A method according to claim 17 wherein both said layers comprise a plurality of liquid crystal elements and including arranging said liquid crystal elements of said two layers such that the two layers have substantially dissimilar geometries.

19. A method according to claim 17 wherein both said layers comprise a plurality of liquid crystal elements and including arranging said liquid crystal elements of said two layers such that the two layers have substantially similar geometries.

20. A method according to claim 17 wherein one of the layers is a liquid crystal device having selectively a transparent and a light diffusing state.

* * * * *